(12) United States Patent
Mokos et al.

(10) Patent No.: US 9,606,887 B2
(45) Date of Patent: Mar. 28, 2017

(54) PERSISTING LARGE VOLUMES OF DATA IN AN EFFICIENT UNOBTRUSIVE MANNER

(71) Applicant: Riverbed Technology, Inc., San Francisco, CA (US)

(72) Inventors: Joseph D. Mokos, Nottingham, NH (US); Edward W. Macomber, Westford, MA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 171 days.

(21) Appl. No.: 14/198,204

(22) Filed: Mar. 5, 2014

(65) Prior Publication Data

US 2014/0280386 A1 Sep. 18, 2014

Related U.S. Application Data

(60) Provisional application No. 61/787,122, filed on Mar. 15, 2013.

(51) Int. Cl.
*G06F 17/30* (2006.01)
*G06F 11/30* (2006.01)
*G06F 11/34* (2006.01)

(52) U.S. Cl.
CPC ...... *G06F 11/3082* (2013.01); *G06F 11/3409* (2013.01)

(58) Field of Classification Search
CPC .................. G06F 17/3028; G06F 17/3409
USPC ....................................... 707/812
See application file for complete search history.

(56) References Cited

U.S. PATENT DOCUMENTS 8,402,226 B1 * 3/2013 Faibish ............... G06F 12/0804
710/52

* cited by examiner

*Primary Examiner* — Vincent Boccio
(74) *Attorney, Agent, or Firm* — Park, Vaughan, Fleming & Dowler LLP; Laxman Sahasrabuddhe (57) ABSTRACT

Embodiments provide a data persisting mechanism that allows for efficient, unobtrusive persisting of large volumes of data while optimizing the use of system resources by the persisting process. In an embodiment, the persisting process includes a self-tuning algorithm that constantly monitors persistence performance and that adjusts persistence time to maintain performance within user-defined criteria. From one aspect, this allows the persisting process to seamlessly adapt to changes in system environment (speeding up persistence during times of low processor usage and slowing down persistence during times of high processor usage) and to reduce or eliminate CPU spikes caused by persisting process. From another aspect, the persisting process results in the data being persisted as quickly as possible given the system constraints, thereby minimizing the possibility of data loss.

20 Claims, 8 Drawing Sheets

PERSISTING LARGE VOLUMES OF DATA IN AN EFFICIENT UNOBTRUSIVE MANNER

CROSS-REFERENCE TO RELATED APPLICATIONS

The present application claims the benefit of U.S. Provisional Patent Application No. 61/787,122, filed Mar. 15, 2013, which is incorporated herein by reference in its entirety.

BACKGROUND

Technical Field

The present disclosure relates generally to persisting large volumes of data.

Background Art

To reduce memory usage on a monitored system, a performance monitoring application typically persists generated performance metrics to a database. But as the number and the reporting rate of the performance metrics increase, the performance monitoring application can be required to persist very large volumes of data in a periodic manner. This can affect the performance of the system being monitored if not performed in an efficient and unobtrusive manner.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
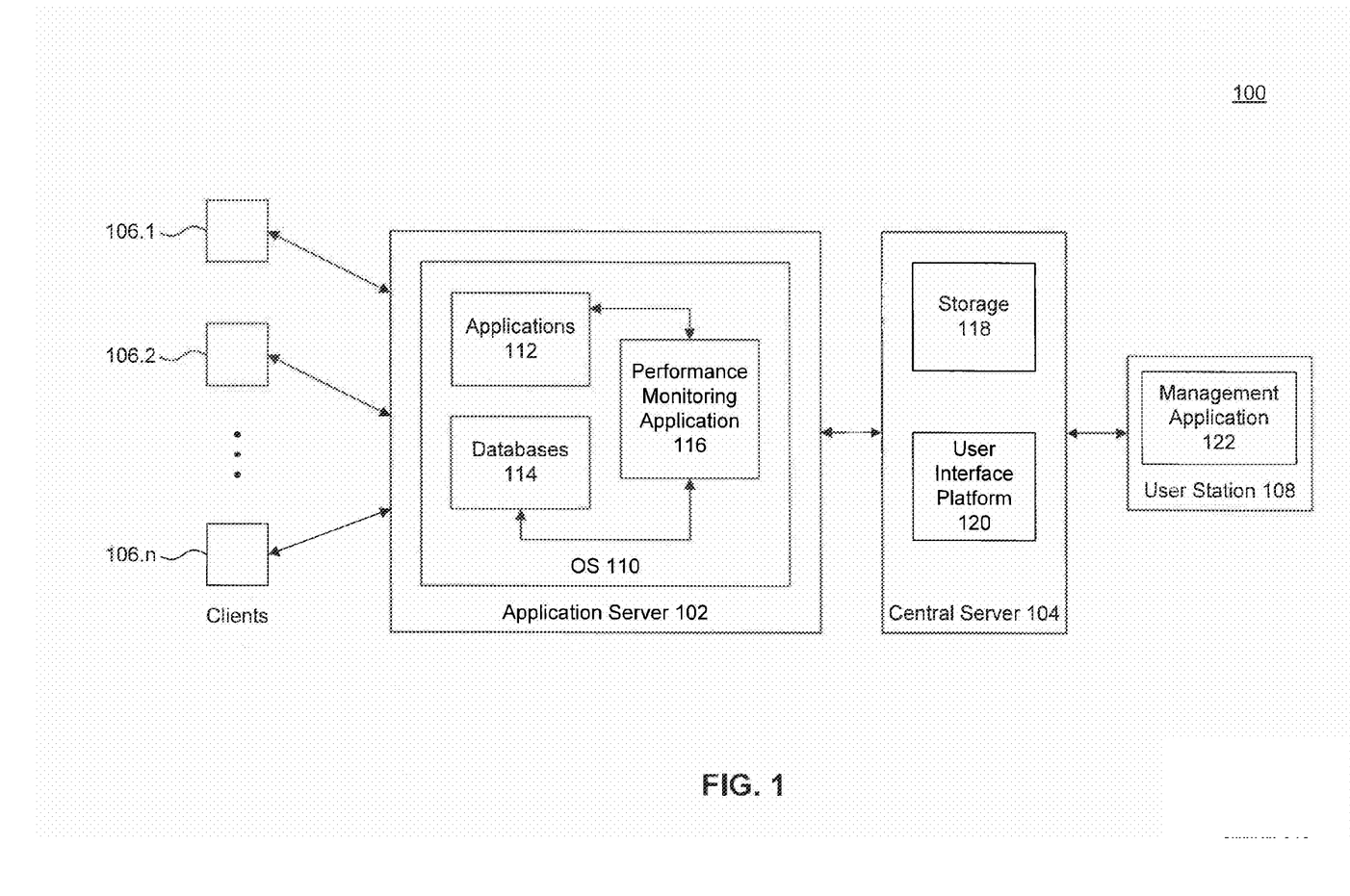
FIG. 1 illustrates an example system according to an embodiment.

FIG. 1 illustrates an example system 100 according to an embodiment. Example system 100 is provided for the purpose of illustration only and is not limiting of embodiments. As shown in FIG. 1, example system 100 includes, without limitation, an application server 102, a central server 104, a plurality of clients 106.1, 106.2, . . . , 106.n, and a user station 108.

Application server 102 implements an Operating System (OS) 110. OS 110 can be any known operating system, such as Windows, UNIX, Linux, and iOS, to name a few examples. OS 110 enables applications 112, databases 114, and a performance monitoring application 116 to run on application server 102. In an embodiment, application server 102 is configured to receive transaction requests from clients 106.1, 106.2 . . . , 106.n. The transaction requests are handled by applications 112 and/or databases 114.

Performance monitoring application 116 is configured to monitor the performance of components running on application server 102. The components can include, for example, applications 112, databases 114, and OS 110. In an embodiment, performance monitoring application 116 continuously collects performance metrics of monitored system components. For example, every second, performance monitoring application 116 may receive a performance metric value (data sample) for a performance metric associated with a particular system component. For each performance metric, performance monitoring application 116 stores the latest N data samples (e.g., N=900) in memory in application server 102. Periodically, e.g., every 15 minutes, performance monitoring application 116 generates a record that contains the latest N samples and forwards the record to central server 104. In another embodiment, performance monitoring application 116 may also generate a consolidated record by aggregating the latest N data samples and may forward the consolidated data record to central server 104. The consolidated record includes statistical information regarding the latest N samples, including an average value, a median value, a minimum value, a maximum value, etc.

Central server 104 includes a storage 118 and a user interface platform 120. In an embodiment, storage 118 is configured to store the data records received from application server 102. User interface platform 120 enables a user interface for accessing and analyzing the data records stored in storage 118. In an embodiment, user interface platform 120 can enable a management application 122 executing on user station 108 to access the data records stored in storage 118.

Figure 2:
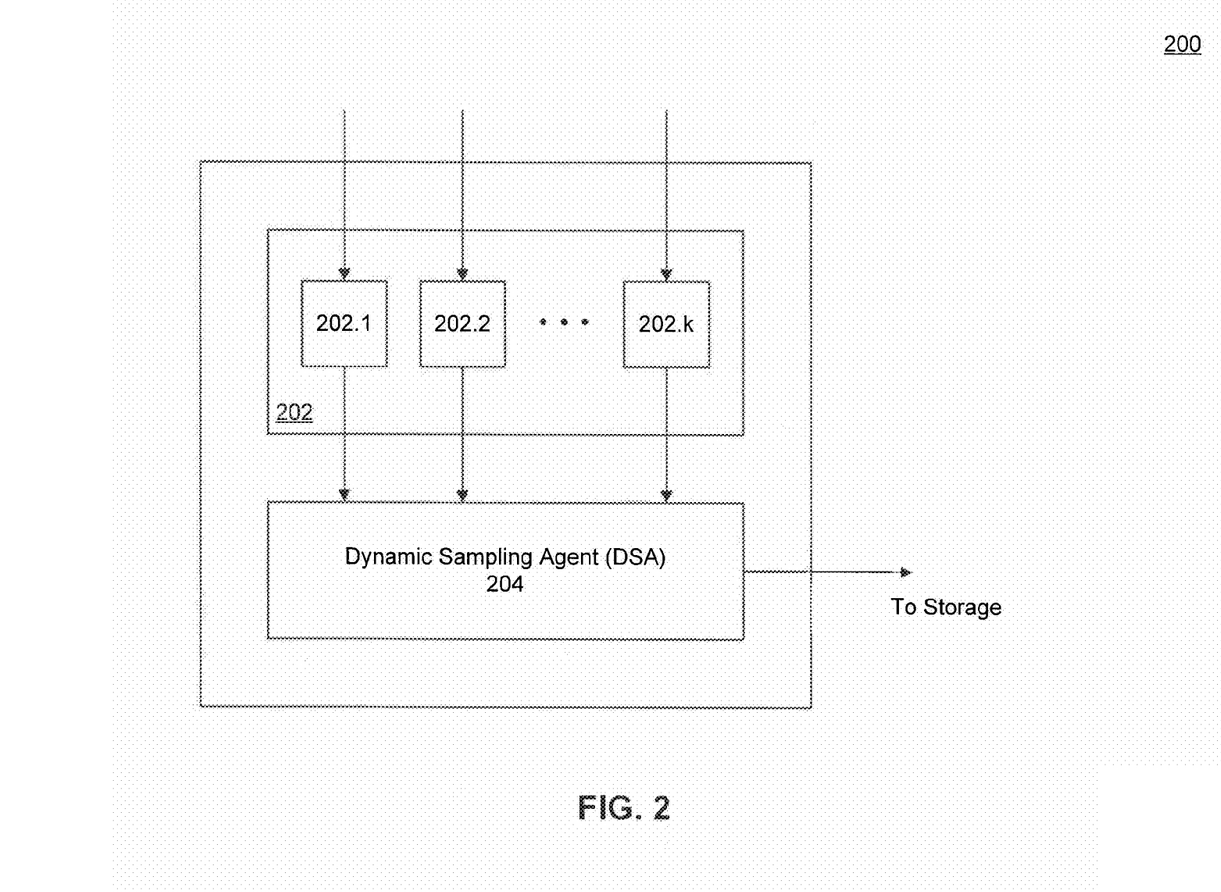
FIG. 2 illustrates an example implementation of a performance monitoring application according to an embodiment.

FIG. 2 illustrates an example implementation 200 of a performance monitoring application according to an embodiment. Example implementation 200 is provided for the purpose of illustration only and is not limiting of embodiments. Example implementation 200 can be an embodiment of performance monitoring application 116 described above. As shown in FIG. 2, example implementation 200 includes a Data Adapters (DA) module 202 and a Dynamic Sampling Agent (DSA) module 204. DA module 202 includes a plurality of data adapters 202.1, 202.2, . . . , 202.k.

In an embodiment, each of data adapters 202.1, 202.2, . . . , 202.k is associated with one or more respective performance metrics associated with a respective system component. As mentioned above, the system component can be, for example, an application, a database, or the OS itself. The performance metric(s) can be related to any performance aspect of the system component. As such, each of data adapters 202.1, 202.2, . . . , 202.k is tailored for the particular performance metric(s) and system component with which it is associated. For example, some of data adapters 202.1, 202.2, . . . , 202.k may be specific to monitoring the performance of databases, such as the input/output (I/O) response time. Others among data adapters 202.1, 202.2, . . . , 202k may be specific to monitoring OS performance, such as paging rate, Central Processing Unit (CPU) usage, memory usage, etc.

In an embodiment, each of data adapters 202.1, 202.2, . . . , 202.k can be configured to generate data samples for its respective performance metric(s) at a defined sample rate and to forward the generated data samples to DSA module 204. For example, data adapters 202.1, 202.2, . . . , 202k can each be configured to generate one data sample per second and to forward the generated data sample to DSA module 204 at the same rate. In another embodiment, one or more data adapters 202.1, 202.2, . . . , 202.k can be disabled when the monitoring of certain performance metrics is not desired.

In an embodiment, DSA module 204 continuously stores the latest N data samples (e.g., N=900) of each performance metric being monitored. Periodically, e.g., every 15 minutes, DSA module 204 processes the latest N data samples of each performance metric to generate a respective object for the performance metric. In an embodiment, the object is a container for a plurality of data samples and corresponding status bytes. The status byte associated with a data sample describes the information contained in the data sample. For example, the status byte can indicate whether or not valid data is present in the data sample bytes, why no valid data is present, etc. In another embodiment, the object is compressed using a compression algorithm.

Once DSA module 204 processes the latest N data samples for all monitored performance metrics to generate a plurality of objects, it begins forwarding the generated objects to storage. For example, referring to FIG. 1, DSA module 204 may forward the generated objects to storage 118 of central server 104. This process of forwarding the generated objects to storage is referred to herein as persisting the objects.

To provide users a highly granular view of system performance, in an embodiment, data adapters 202.1, 202.2, . . . , 202.k can be implemented to monitor a very large number of performance metrics (e.g., 20,000). Further, data adapters 202.1, 202.2, . . . , 202.k can be configured to report at a higher sample rate than one data sample per second. As such, DSA module 204 can be required to persist large volumes of objects to storage in some embodiments. But with DSA module 204 typically running on the same server (e.g., application server 102) as the system components (e.g., applications 112, databases 114, OS 110) that it is monitoring, there can be a risk of DSA module 204 affecting the performance of the system components if the persisting is not performed in an efficient, unobtrusive manner. For example, DSA module 204 can slow down monitored system components if the persisting is done in a manner that consumes large system resources.

Embodiments, as further described below, provide a data persisting mechanism that allows for efficient, unobtrusive persisting of large volumes of data while optimizing the use of system resources by the persisting process. In an embodiment, the persisting process includes a self-tuning algorithm that constantly monitors persistence performance and that adjusts persistence time to maintain performance within user-defined criteria. From one aspect, this allows the persisting process to seamlessly adapt to changes in system environment (speeding up persistence during times of low processor usage and slowing down persistence during times of high processor usage) and to reduce or eliminate CPU spikes caused by persisting process. From another aspect, the persisting process results in the data being persisted as quickly as possible given the system constraints, thereby minimizing the possibility of data loss. In the following, example embodiments of the data persisting mechanism are provided. For the purpose of illustration only, these example embodiments are described with respect to objects containing performance metrics data samples. However, as would be understood by a person of skill in the art based on the teachings herein, embodiments are not limited to such a data type and can be used to persist any kind of data.

As mentioned above, the persisting process operates periodically to persist generated objects to storage. In an embodiment, the persisting process runs according to a persistence cycle, persisting within each persistence cycle time the objects corresponding to the latest N data samples of each performance metric. To reduce memory usage, the objects corresponding to the latest N data samples are persisted within a timeframe that does not exceed the time it takes to produce N data samples. For example, if each object corresponds to 900 1-second data samples, which require 15 minutes to generate, then the persisting process will persist all the data objects within 15 minutes.

In an embodiment, the persistence cycle time is divided into a plurality of time segments having an equal segment length. Similarly, the objects to persist are grouped into a plurality of object segments having an equal segment size. The persisting process persists one object segment (comprising multiple objects) per time segment of the persistence cycle time. To achieve desired performance, the segment size and/or the segment length can be adjusted at the beginning of each persistence cycle time. Depending on the segment size and the segment length, the objects are persisted more or less rapidly (i.e., at a greater or a lower data rate) within the persistence cycle time.

Figure 3:
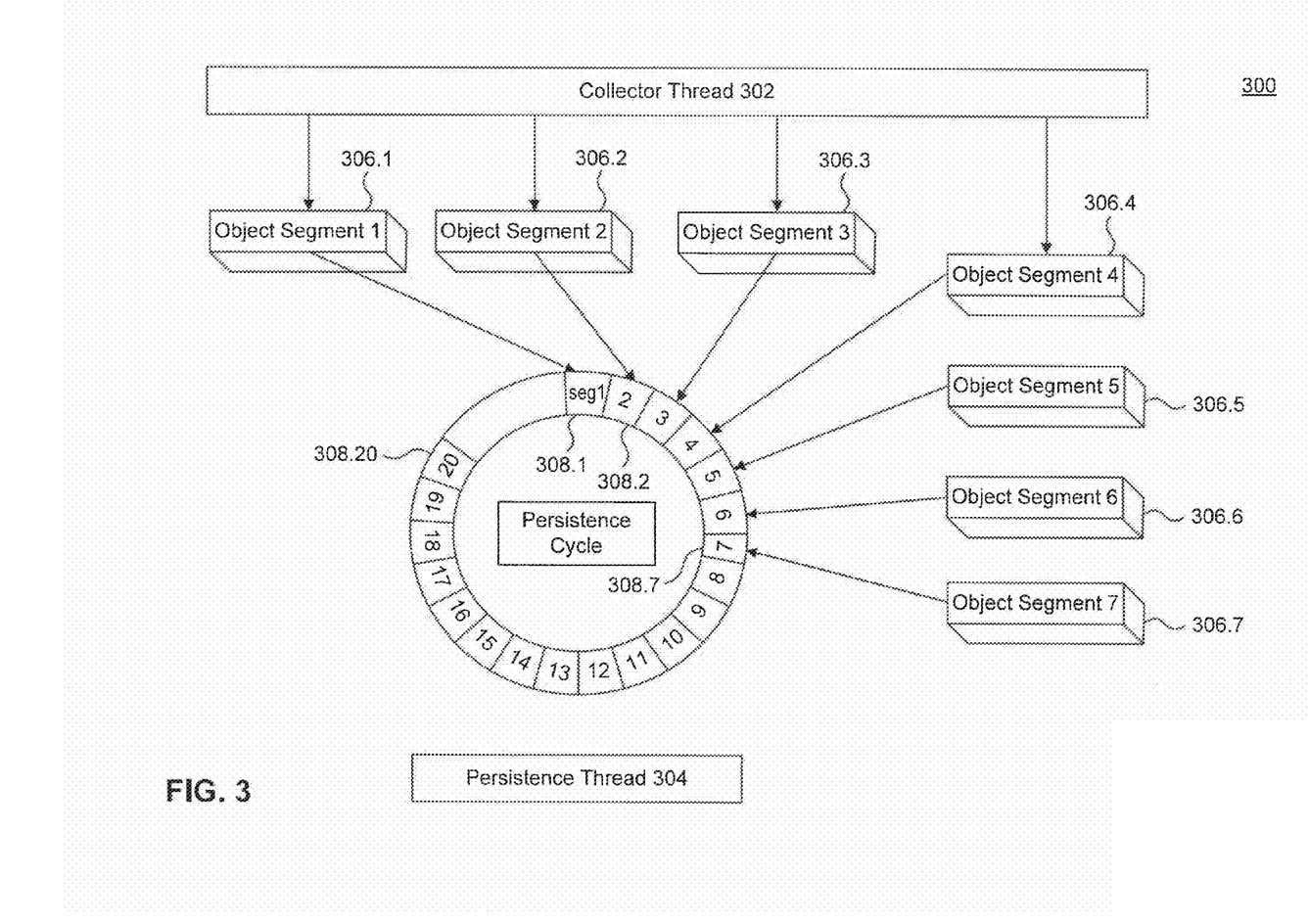
FIG. 3 illustrates an example persistence cycle according to an embodiment.

FIG. 3 illustrates an example persistence cycle 300 according to an embodiment. Example persistence cycle 300 is provided for the purpose of illustration only and is not limiting of embodiments. Example persistence cycle 300 is described with reference to a collector thread 302 and a persistence thread 304 of DSA module 204. However, as would be understood by a person of skill in the art based on the teachings herein, embodiments are not limited to this example implementation.

Example persistence cycle 300 begins with collector thread 302 collecting the data samples for each object to be persisted, aggregating the data samples into respective objects, and compressing the objects. Collector thread 302 then asynchronously notifies persistence thread 304 that the objects to be persisted are ready.

Persistence thread 304 begins by updating the current segment size if necessary. As mentioned above, the segment size indicates the number of objects to persist in a time segment of the persistence cycle time. In an embodiment, the segment size is set to a default value (e.g., 500 objects) when the persisting process is initialized. Updating the current segment size provides a first layer for adjusting a persistence data rate for persisting the objects to storage. In an embodiment, to determine if the current segment size needs to be adjusted, a current system performance level is compared to a configurable desired performance level. If the current system performance level is above the desired performance level, the current segment size is increased, resulting in a greater persistence data rate. Otherwise, if the current system performance level is below the desired performance level, the current segment size is decreased, resulting in a lower persistence data rate.

In another embodiment, persistence thread 304 determines system performance level for the last P (e.g., 3) persistence cycles. If system performance level for all of the last P persistence cycles is below the desired performance level, then the current segment size is updated. In an embodiment, the system performance level in a given persistence cycle is determined as the average response time of a database where the objects are persisted, over all object segments persisted in the given persistence cycle. In an embodiment, the current segment size is updated according to: current segment size=(desired response time*current segment/average response time).

After determining the current segment size, persistence thread 304 determines whether the objects to be persisted can be persisted within the persistence cycle time given the current segment size and a current segment length. If not, then the current segment length is updated. As mentioned above, the current segment length indicates the length in time of a time segment of the persistence cycle time. In an embodiment, the segment length is set to a default value (e.g., 10 seconds) when the persisting process is initialized. Updating the current segment length provides a second layer for adjusting the persistence data rate for persisting the objects to storage.

In an embodiment, if the segment size was increased at the beginning of the current persistence cycle, then the objects necessarily can be persisted within the persistence cycle time based on the current segment length, and the current segment length does not need to be updated. As such, persistence thread 304 proceeds to persist the objects to storage according to the current segment size and the current segment length. As shown in FIG. 3, persistence thread 304 persists one object segment of a plurality of object segments 306.1, 306.2, . . . , 306.7 per time segment of a plurality of time segments 308.1, 308.2, . . . , 308.20 of the persistence cycle time. Depending on the current segment size, the plurality of time segments 308.1, 308.2, . . . , 308.20 may or may not be used in their entirety for persisting data.

If the segment size was decreased at the beginning of the current persistence cycle, then the current segment length may need to be updated so that the objects can be persisted within the persistence cycle time. In an embodiment, persistence thread 304 compares a required number of segments to persist the objects based on the decreased segment size to a current number of segments based on the current segment length. In an embodiment, the required number of segments is computed as (number of objects+(current segment size−1))/(current segment size), and the current number of segments is computed as (persistence cycle time/current segment length).

If the required number of segments exceeds the current number of segments, then the current segment length is decreased. In an embodiment, the current segment length is set equal to (persistence cycle time/required number of segments). Otherwise, the current segment length is maintained the same. After updating the current segment length, persistence thread 304 proceeds to persist the objects to storage according to the current segment size and the current segment length.

Figure 4:
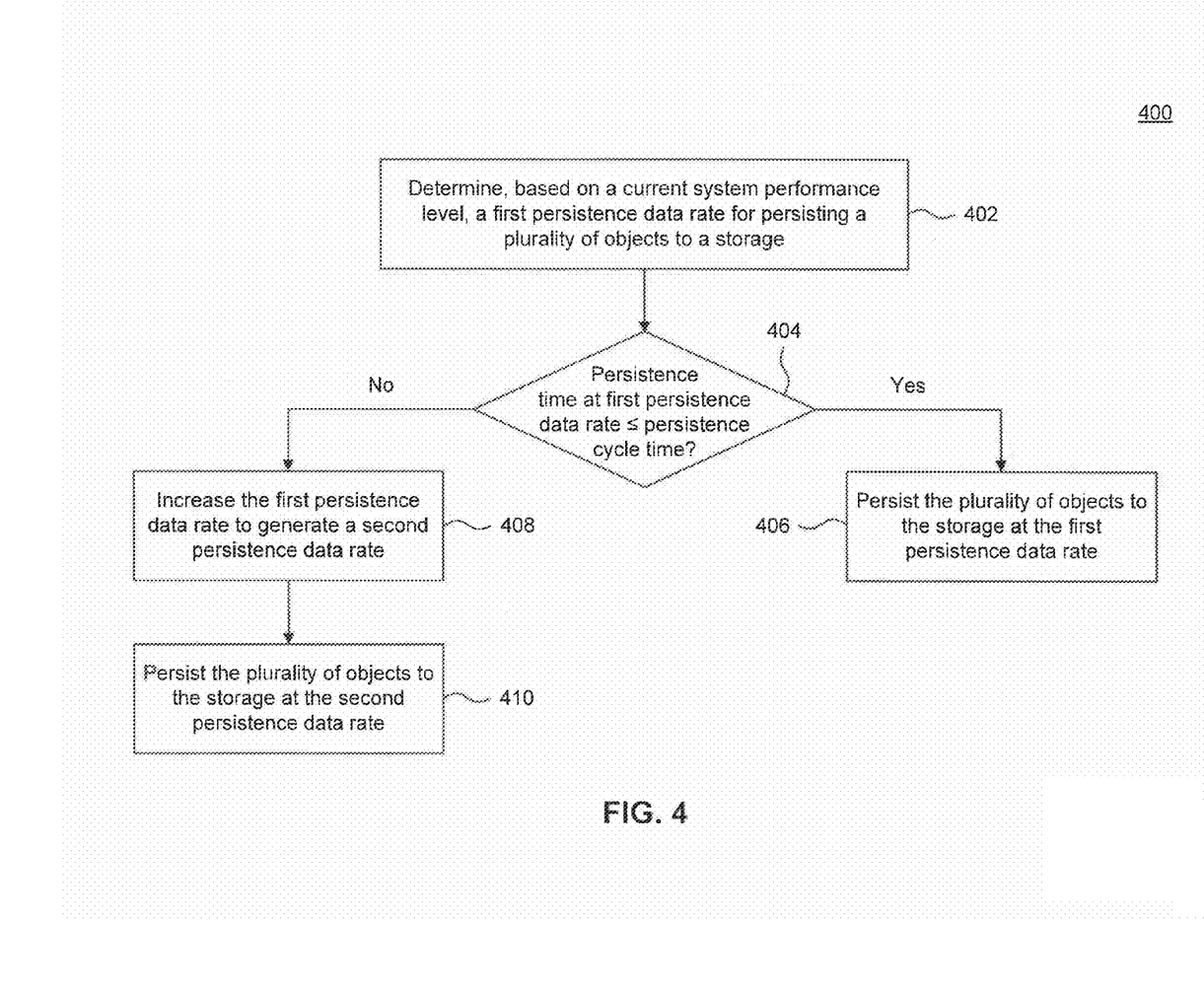
FIGS. 4-7 illustrate example processes according to embodiments.

FIG. 4 illustrates an example process 400 according to an embodiment. Example process 400 is provided for the purpose of illustration only and is not limiting of embodiments. Example process 400 can be used by a persisting process to persist data to storage, and more specifically by a performance monitoring application, such as performance monitoring application 116, to persist performance metrics data objects to storage. Example process 400 illustrates steps performed in a persistence cycle of the persisting process. The persistence cycle repeats periodically and has a fixed persistence cycle time, which can be configurable.

As shown in FIG. 4, process 400 begins in step 402, which includes determining, based on a current system performance level, a first persistence data rate for persisting a plurality of objects to a storage. In an embodiment, step 402 further includes increasing a previous persistence data rate to determine the first persistence data rate when the current system performance level exceeds a desired performance level; and decreasing the previous persistence data rate to determine the first persistence data rate when the current system performance level is below the desired performance level.

The current system performance level can correspond to the average response time of a database where the objects are persisted. Alternatively, the current system performance level can correspond to a performance measure of the system on which the persisting process is running. For example, referring to FIG. 1, the current system performance level may correspond to a performance measure of application server 102. In an embodiment, the first persistence data rate corresponds to the persistence data rate obtained by updating the current segment size as described above.

Process 400 then proceeds to step 404, which includes determining whether a persistence time required to persist the plurality of objects at the first persistence data rate is less than or equal to the persistence cycle time. If the answer is yes, process 400 proceeds to step 406, which includes persisting the plurality of objects to the storage at the first persistence data rate. In an embodiment, where the current system performance level exceeds the desired performance level in step 402, the persistence time incurred to persist the plurality of objects to the storage at the first persistence data rate in step 406 is lower than a previous persistence time incurred to persist an equal number of objects to the storage at the previous persistence data rate in a previous persistence cycle. In other words, the plurality of objects are persisted earlier within the persistence cycle time than during the previous persistence cycle.

If the answer is no in step 404, process 400 proceeds to step 408, which includes increasing the first persistence data rate to generate a second persistence data rate. In an embodiment, the second persistence data corresponds to the persistence data rate obtained by updating the current segment length as described above. The second persistence data rate ensures that the plurality of objects can be persisted within the persistence cycle time.

Process 400 terminates in step 410, which includes persisting the plurality of objects to the storage at the second persistence data rate.

Figure 5:
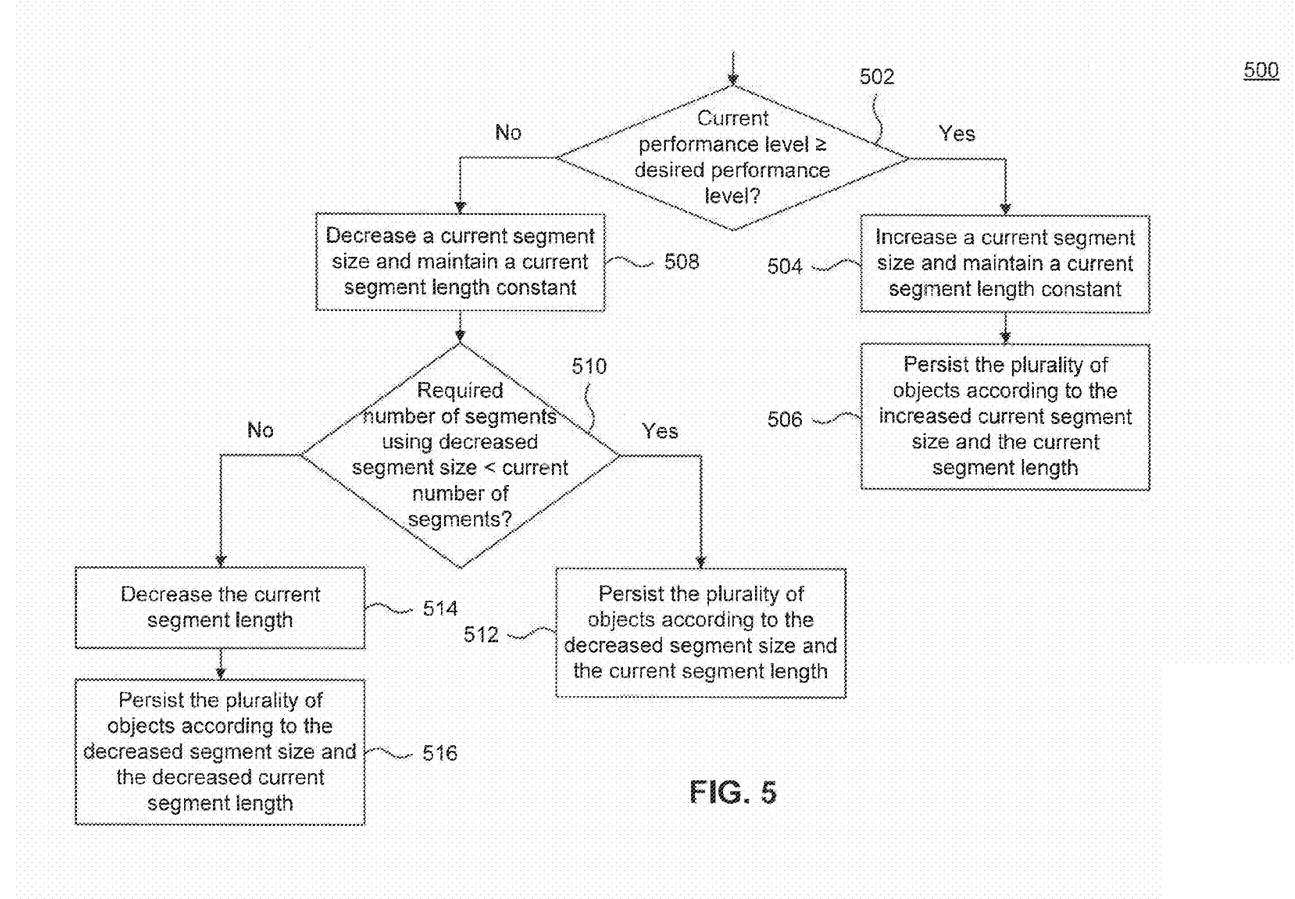

FIG. 5 illustrates another example process 500 according to an embodiment. Example process 500 is provided for the purpose of illustration only and is not limiting of embodiments. Example process 500 can be used by a persisting process to persist data to storage, and more specifically by a performance monitoring application, such as performance monitoring application 116, to persist performance metrics data objects to storage. Example process 500 illustrates steps performed in a persistence cycle of the persisting process. The persistence cycle repeats periodically and has a fixed persistence cycle time, which can be configurable. Further, the persistence cycle time is divided into a plurality of time segments having an equal segment length, and the objects to persist are grouped into a plurality of object segments having an equal segment size. The segment size and the segment length are initially set to respective default values, and then updated at the beginning of each persistence cycle as further described below.

As shown in FIG. 5, process 500 begins in step 502, which includes determining whether a current system performance level is greater than or equal to a desired performance level. The current system performance level can correspond to the average response time of a database where the objects are persisted. Alternatively, the current system performance level can correspond to a performance measure of the system on which the persisting process is running. For example, referring to FIG. 1, the current system performance level may correspond to a performance measure of application server 102.

If the answer in step 502 is yes, process 500 proceeds to step 504, which includes increasing a current segment size and maintaining a current segment length constant. In an embodiment, step 504 includes increasing the current segment size proportionally to the ratio of the current system performance level to the desired performance level. In another embodiment, if the current system performance level is equal to (but not greater than) the desired performance level, both the current segment size and the current segment length are maintained the same in step 504. Subsequently, process 500 proceeds to step 506, which includes persisting the plurality of objects according to the increased current segment size and the current segment length.

If the answer in step 502 is no, process 500 proceeds to step 508, which includes decreasing the current segment size and maintaining the current segment length constant. In an embodiment, step 508 includes decreasing the current segment size proportionally to the ratio of the current system performance level to the desired performance level. In an embodiment, steps 504 and 508 are each equivalent to determining a first persistence data rate for persisting the plurality of objects.

Subsequently, in step 510, process 500 includes determining a required number of segments required to persist the plurality of objects within the persistence cycle time based on the current segment size; and comparing the required number of segments to a current number of segments in the persistence cycle time. If the required number of segments is less than or equal to the current number of segments, process 500 transitions to step 512, which includes persisting the plurality of objects according to the decreased segment size and the current segment length (i.e., at the first persistence data rate).

Otherwise, if the required number of segments is greater than the current number of segments, process 500 proceeds to step 514, which includes decreasing the current segment length. In an embodiment, step 514 is equivalent to increasing the first persistence data rate to generate a second persistence data rate. Process 500 then proceeds to step 516, which includes persisting the plurality of objects according to the decreased segment size and the decreased segment length (i.e., at the second persistence data rate).

As mentioned above, in an embodiment, the persisting process is performed by a persistence thread, such as persistence thread 304 of DSA module 204. In another embodiment, the persistence thread executes two processing loops—a cycle processing loop and a segment processing loop. Example embodiments of the cycle processing loop and the segment processing loop are now provided.

Figure 6:
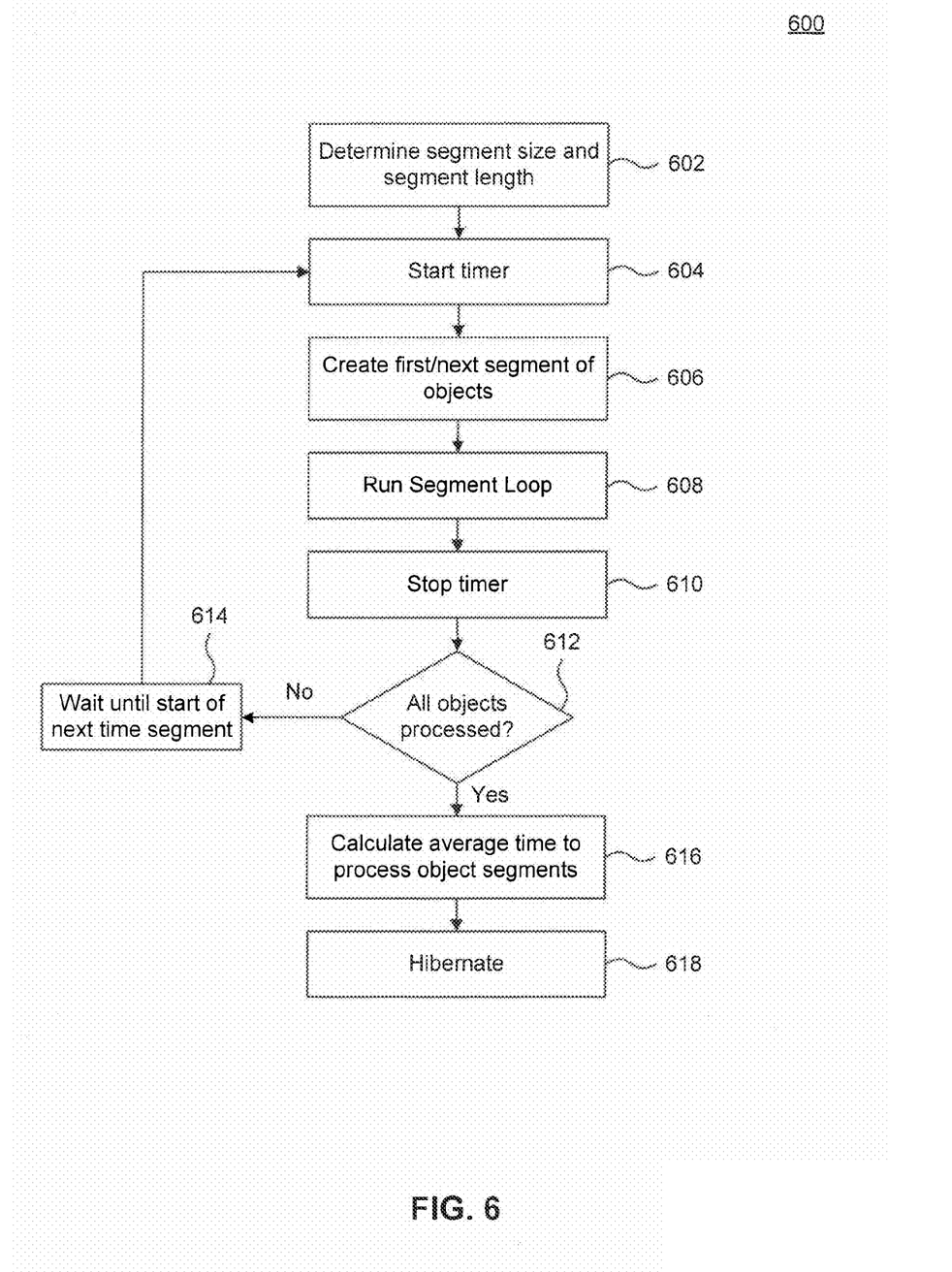

FIG. 6 illustrates an example process 600 that corresponds to the operation of the cycle processing loop. Example process 600 is provided for the purpose of illustration only and is not limiting of embodiments. As shown in FIG. 6, process 600 begins in step 602, which includes determining a segment size and a segment length. The segment size and the segment length are determined as described above with respect to FIGS. 3 and 5, for example.

Then, process 600 proceeds to step 604, in which a timer is started. In step 606, the first or next segment of objects is created. The first or next object segment includes a plurality of objects according to the segment size. The object segment created in step 606 is then passed to the segment processing loop in step 608. The segment processing loop persists the object segment to storage. When the segment processing loop terminates, processing returns to step 610, in which the timer is stopped. The elapsed time indicates the persistence time of the object segment created in step 606.

Subsequently, step 612 includes determining whether all objects have been processed. If not, process 600 proceeds to step 614, which includes waiting until the start of the next time segment of the persistence cycle to process a next segment of objects. Otherwise, process 600 proceeds to step 616, which includes calculating an average time to persist object segments in the current persistence cycle. In an embodiment, this average time is used as a measure of the current system performance level for updating the segment size and segment length in the next persistence cycle. Process 600 terminates in step 618, in which the cycle processing loop hibernates until it is woken up at the beginning of the next persistence cycle, e.g., by the collector thread.

Figure 7:
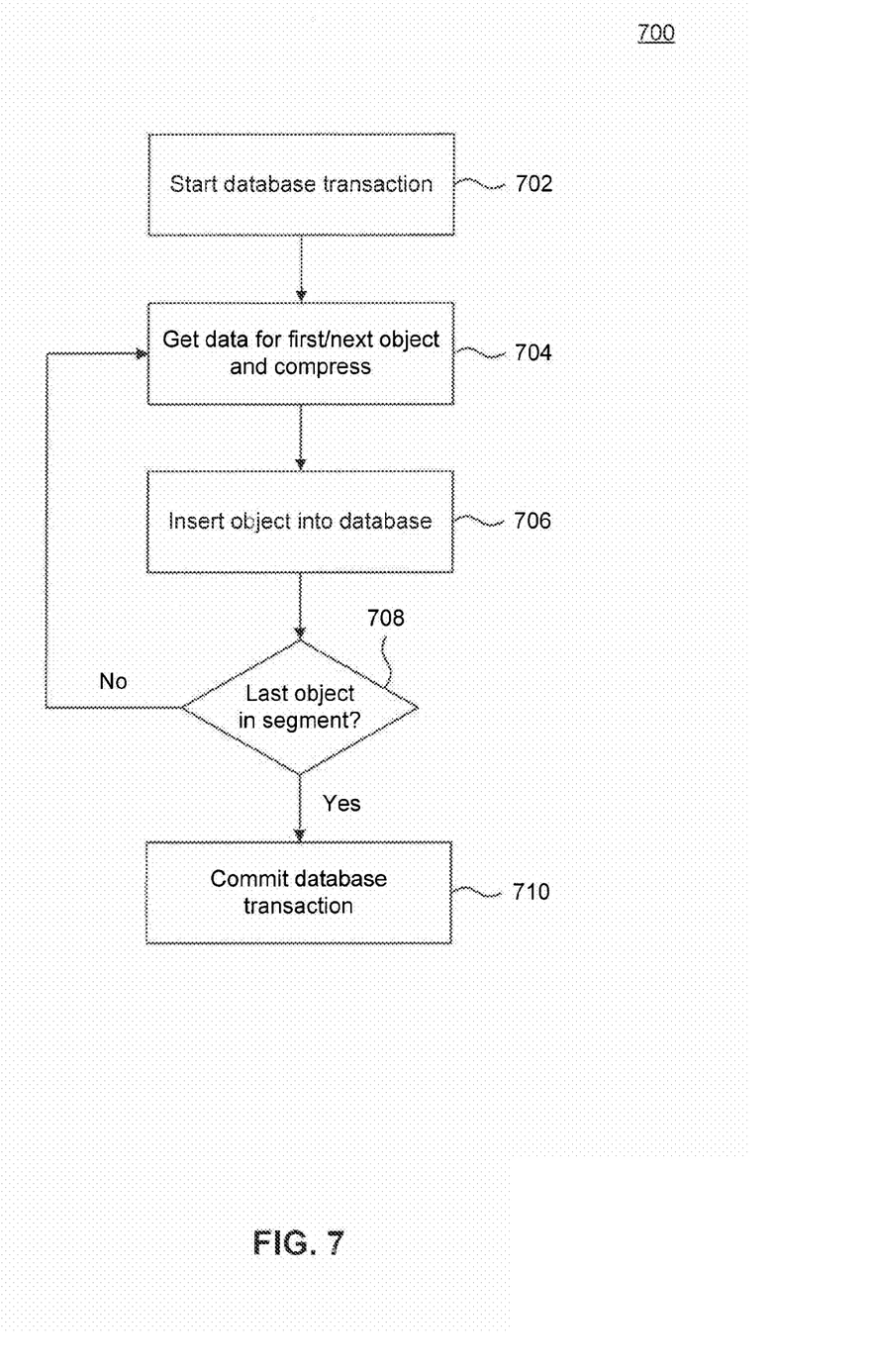

FIG. 7 illustrates an example process 700 that corresponds to the operation of the segment processing loop. Example process 700 is provided for the purpose of illustration only and is not limiting of embodiments. As shown in FIG. 7, process 700 begins in step 702, which includes starting a database transaction. Subsequently, step 704 includes obtaining the data for the first or next object in the object segment being processed, and compressing the data. In an embodiment, step 704 includes processing and compressing the latest N data samples and corresponding status bytes of a performance metric to generate the first or next object. Then, in step 706, process 700 includes inserting the object into a database. In an embodiment, step 706 includes generating a SQL insert statement for the object.

Subsequently, step 708 includes determining whether the object is the last object in the object segment being processed. If not, process 700 returns to step 704, wherein the data for the next object in the object segment is obtained. Otherwise, process 700 proceeds to step 710, which includes committing the database transaction. Step 710 commits the insert statements for all the objects in the object segment.

Embodiments of the present disclosure can be implemented in hardware, software or as a combination of software and hardware. Consequently, embodiments of the disclosure may be implemented in the environment of a computer system or other processing system, such as example computer system 800 illustrated in FIG. 8. Embodiments described above in FIGS. 1-3 may execute on one or more computer systems 800. Furthermore, each of the steps of the processes depicted in FIGS. 4-7 can be implemented on one or more computer systems 800.

Figure 8:
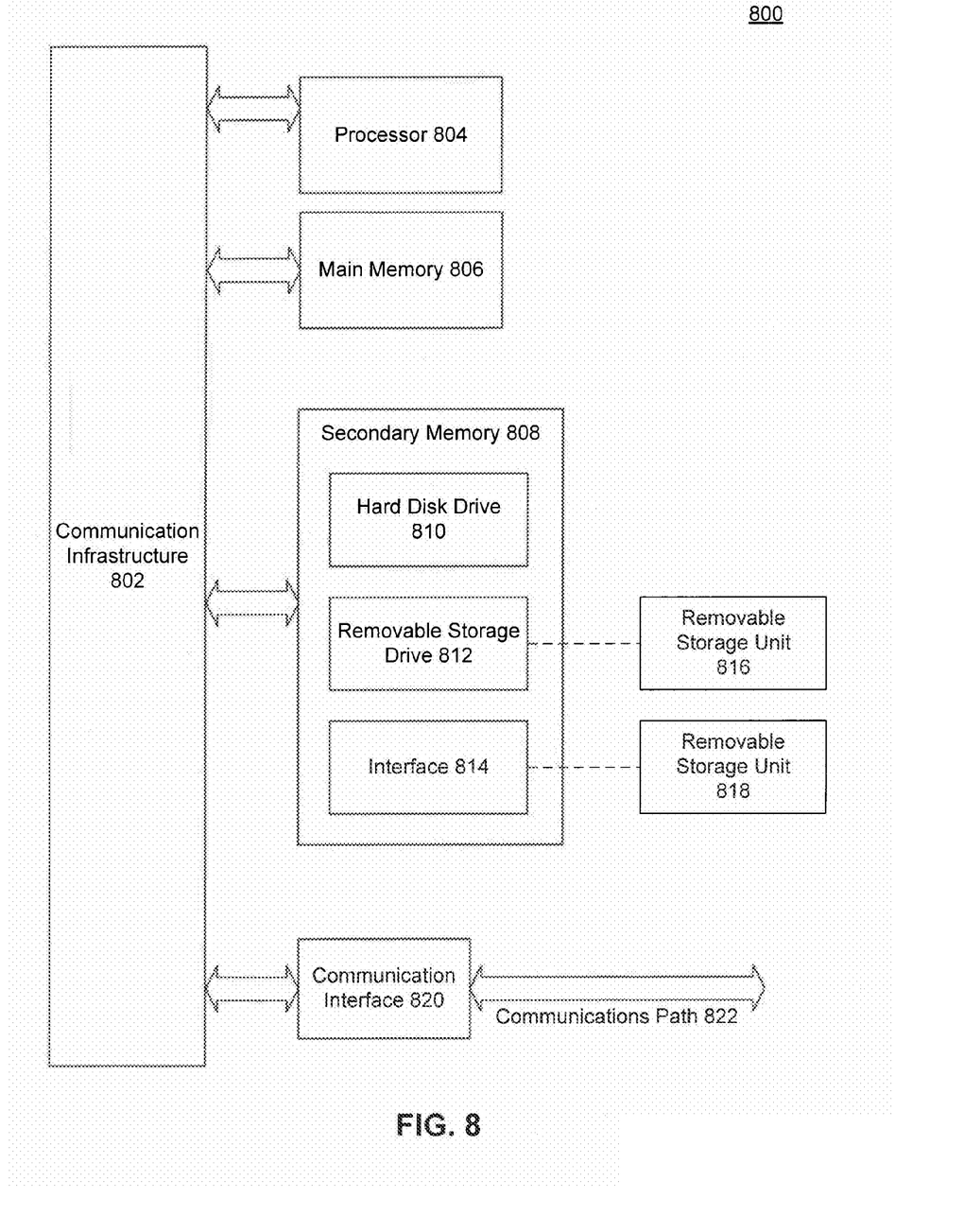
FIG. 8 illustrates an example computer system in which embodiments can be practiced or implemented.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A system, comprising:
a non-transitory computer readable storage medium; and
a processor, coupled to the non-transitory computer readable storage medium, configured to execute an application, wherein the application is configured to:
determine, based on a current performance level of the system, a first persistence data rate for persisting a plurality of objects to the storage, wherein the plurality of objects that are to be persisted in each persistence cycle time are divided into a plurality of object segments of equal size, wherein the persistence cycle time is divided into a plurality of time segments, and wherein each object segment is persisted during each time segment;
if a persistence time required to persist the plurality of objects to the storage at the first persistence data rate is within a persistence cycle time, persist the plurality of objects to the storage at the first persistence data rate; and
if the persistence time required to persist the plurality of objects to the storage at the first persistence data rate exceeds the persistence cycle time,
increase the first persistence data rate to generate a second persistence data rate, wherein said increasing the first persistent rate comprises increasing a segment size of one or more object segments, decreasing a segment length of one or more time segments, or a combination thereof, and
persist the plurality of objects to the storage at the second persistence data rate.

2. The system of claim 1, wherein the application is a performance monitoring application, the application further configured to:
monitor a plurality of system components to generate performance metrics data; and
process the performance metrics data to generate the plurality of objects.

3. The system of claim 1, wherein the application is further configured to:
increase a previous persistence data rate to determine the first persistence data rate when the current performance level exceeds a desired performance level; and
decrease a previous persistence data rate to determine the first persistence data rate when the current performance level is below the desired performance level.

4. The system of claim 3, wherein the current performance level exceeds the desired performance level, and wherein a first persistence time incurred to persist the plurality of objects to the storage at the first persistence data rate is lower than a previous persistence time incurred to persist an equal number of objects to the storage at the previous persistence data rate in a previous persistence cycle.

5. The system of claim 3, wherein the application is further configured to:
increase a current segment size, the current segment size indicating a number of objects to persist per a current segment length, to increase the previous persistence data rate; and
decrease the current segment size to decrease the previous persistence data rate.

6. The system of claim 5, wherein the application is further configured to:
determine a required number of segments required to persist the plurality of objects within the persistence cycle time based on the current segment size; and
compare the required number of segments to a current number of segments in the persistence cycle time.

7. The system of claim 6, wherein the required number of segments exceeds the current number of segments, the application is further configured to:
decrease the current segment length to increase the first persistence data rate to generate the second persistence data rate.

8. A method for persisting data to a storage responsive to system performance, comprising:
determining, based on a current system performance level, a first persistence data rate for persisting a plurality of objects to the storage, wherein the plurality of objects that are to be persisted in each persistence cycle time are divided into a plurality of object segments of equal size, wherein the persistence cycle time is divided into a plurality of time segments, and wherein each object segment is persisted during each time segment;
if a persistence time required to persist the plurality of objects to the storage at the first persistence data rate is within a persistence cycle time, persisting the plurality of objects to the storage at the first persistence data rate; and
if the persistence time required to persist the plurality of objects to the storage at the first persistence data rate exceeds the persistence cycle time,
increasing the first persistence data rate to generate a second persistence data rate, wherein said increasing the first persistent rate comprises increasing a segment size of one or more object segments, decreasing a segment length of one or more time segments, or a combination thereof, and
persisting the plurality of objects to the storage at the second persistence data rate.

9. The method of claim 8, further comprising:
increasing a previous persistence data rate to determine the first persistence data rate when the current system performance level exceeds a desired performance level; and
decreasing the previous persistence data rate to determine the first persistence data rate when the current system performance level is below the desired performance level.

10. The method of claim 9, wherein the current system performance level exceeds the desired performance level, and wherein a first persistence time incurred to persist the plurality of objects to the storage at the first persistence data rate is lower than a previous persistence time incurred to persist an equal number of objects to the storage at the previous persistence data rate in a previous persistence cycle.

11. The method of claim 9, wherein increasing the previous persistence data rate comprises increasing a current segment size, the current segment size indicating a number of objects to persist per a current segment length, and wherein decreasing the previous persistence data rate comprises decreasing the current segment size.

12. The method of claim 11, wherein the current system performance level is below the desired performance level, the method further comprising:
determining a required number of segments required to persist the plurality of objects within the persistence cycle time based on the current segment size; and
comparing the required number of segments to a current number of segments in the persistence cycle time.

13. The method of claim 12, wherein the required number of segments exceeds the current number of segments, and wherein increasing the first persistence data rate to generate the second persistence data rate comprises decreasing the current segment length.

14. A computer program product comprising a non-transitory computer readable medium having control logic stored therein, the control logic, when executed by a processor, causes the processor to perform a method for persisting data to a storage responsive to system performance, the method comprising:
determining, based on a current system performance level, a first persistence data rate for persisting a plurality of objects to the storage, wherein the plurality of objects that are to be persisted in each persistence cycle time are divided into a plurality of object segments of equal size, wherein the persistence cycle time is divided into a plurality of time segments, and wherein each object segment is persisted during a corresponding time segment;
if a persistence time required to persist the plurality of objects to the storage at the first persistence data rate is within a persistence cycle time, persisting the plurality of objects to the storage at the first persistence data rate; and
if the persistence time required to persist the plurality of objects to the storage at the first persistence data rate exceeds the persistence cycle time,
increasing the first persistence data rate to generate a second persistence data rate, wherein said increasing the first persistent rate comprises increasing a segment size of one or more object segments, decreasing a segment length of one or more time segments, or a combination thereof, and
persisting the plurality of objects to the storage at the second persistence data rate.

15. The computer program product of claim 14, the method further comprising:
increasing a previous persistence data rate to determine the first persistence data rate when the current system performance level exceeds a desired performance level; and
decreasing the previous persistence data rate to determine the first persistence data rate when the current system performance level is below the desired performance level.

16. The computer program product of claim 15, wherein the current performance level exceeds the desired performance level, and wherein a first persistence time incurred to persist the plurality of objects to the storage at the first persistence data rate is lower than a previous persistence time incurred to persist an equal number of objects to the storage at the previous persistence data rate in a previous persistence cycle.

17. The computer program product of claim 15, wherein increasing the previous persistence data rate comprises increasing a current segment size, the current segment size indicating a number of objects to persist per a current segment length, and wherein decreasing the previous persistence data rate comprises decreasing the current segment size.

18. The computer program product of claim 17, wherein the current system performance level is below the desired performance level, the method further comprising:
   determining a required number of segments required to persist the plurality of objects within the persistence cycle time based on the current segment size; and
   comparing the required number of segments to a current number of segments in the persistence cycle time.

19. The computer program product of claim 18, wherein the required number of segments exceeds the current number of segments, and wherein increasing the first persistence data rate to generate the second persistence data rate comprises decreasing the current segment length.

20. The computer program product of claim 14, the method further comprising:
   monitor a plurality of system components to generate performance metrics data; and
   processing the performance metrics data to generate the plurality of objects.

* * * * *